United States Patent
Jensen et al.

(10) Patent No.: US 8,654,342 B2
(45) Date of Patent: Feb. 18, 2014

(54) INTERFEROMETRIC DISTANCE-MEASURING METHOD WITH DELAYED CHIRP SIGNAL AND SUCH AN APPARATUS

(75) Inventors: Thomas Jensen, Rorschach (CH); Marcel Rohner, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 383 days.

(21) Appl. No.: 12/937,529

(22) PCT Filed: May 29, 2009

(86) PCT No.: PCT/AZ2009/000003
§ 371 (c)(1),
(2), (4) Date: Nov. 12, 2010

(87) PCT Pub. No.: WO2010/000044
PCT Pub. Date: Jan. 7, 2010

(65) Prior Publication Data
US 2011/0051146 A1 Mar. 3, 2011

(30) Foreign Application Priority Data
May 28, 2008 (EP) .................................. 08104146

(51) Int. Cl.
*G01B 9/02* (2006.01)
(52) U.S. Cl.
USPC ........................................................ 356/487
(58) Field of Classification Search
USPC .................... 356/484–498, 4.09, 4.1; 372/25, 372/29.016, 30
See application file for complete search history.

(56) References Cited

U.S. PATENT DOCUMENTS

| | | | | |
|---|---|---|---|---|
| 4,817,207 A | * | 3/1989 | Smith et al. | 398/185 |
| 4,830,486 A | * | 5/1989 | Goodwin | 356/4.09 |
| 5,371,587 A | * | 12/1994 | de Groot et al. | 356/486 |
| 6,904,100 B1 | * | 6/2005 | Romaniuk | 375/308 |

(Continued)

FOREIGN PATENT DOCUMENTS

| | | | | |
|---|---|---|---|---|
| EP | 1 906 137 A1 | | 4/2008 | |
| EP | 1906137 A1 | * | 4/2008 | ............... H01S 5/04 |
| JP | 57-190387 | | 11/1982 | |
| JP | 57190387 A | * | 11/1982 | ............... H01S 3/18 |

OTHER PUBLICATIONS

Onodera, Ribun et al., Two-wavelength laser-diode heterodyne interferometry with one phasemeter, Optics Letters, vol. 20, No. 24 (Dec. 15, 1995), pp. 2502-2504.*
De Groot, Peter et al., Chirped synthetic-wavelength interferometry, Optics Letters, vol. 17, No. 22 (Nov. 15, 1992), pp. 1626-1628.*

(Continued)

*Primary Examiner* — Michael A Lyons
(74) *Attorney, Agent, or Firm* — Maschoff Brennan

(57) ABSTRACT

In a distance-measuring method comprising a distance-measuring apparatus having at least one frequency-modulatable laser source for producing chirped laser radiation. The laser radiation has radiation components with opposite chirp as time dependency of the modulated wavelengths, the simultaneous oppositeness of the frequency curve being realized via an optical delay path (3) for one of the two radiation components. The radiation produced is passed in a measuring interferometer (5) to a target (6) and parallel via a local Oscillator. After reception of the laser radiation scattered back from the target (6) and passed via the local oscillator path, the laser radiation received is converted into signals and the distance to the at least one target (6) is determined from the signals on the basis of interferometric mixing.

15 Claims, 3 Drawing Sheets

(56) References Cited

U.S. PATENT DOCUMENTS

| | | | | |
|---|---|---|---|---|
| 7,139,446 | B2* | 11/2006 | Slotwinski | 385/12 |
| 7,375,819 | B2* | 5/2008 | Courville et al. | 356/487 |
| 7,507,203 | B2* | 3/2009 | Sebastian et al. | 600/300 |
| 2006/0074326 | A1* | 4/2006 | Sebastian et al. | 600/500 |
| 2006/0182383 | A1* | 8/2006 | Slotwinski | 385/12 |
| 2006/0203224 | A1* | 9/2006 | Sebastian et al. | 356/4.09 |
| 2007/0097376 | A1* | 5/2007 | Courville et al. | 356/487 |
| 2007/0189341 | A1* | 8/2007 | Belsley | 372/10 |

OTHER PUBLICATIONS

Hartmann, L. et al., An absolute distance interferometer with two external cavity diode lasers, Measurement Science and Technology, vol. 19, No. 045307 (Mar. 4, 2008), pp. 1-6.*

R. Onodera et al, "Two-wavelength laser-diode heterodyne interferometry with one phasemeter," Opt. Lett. 20, 2502-2504 (1995).

L Hartmann, et al "An absolute distance interferometer with two external cavity diode lasers" Measurement Science and Technology, vol. 19, No. 4, 2008.

* cited by examiner

INTERFEROMETRIC DISTANCE-MEASURING METHOD WITH DELAYED CHIRP SIGNAL AND SUCH AN APPARATUS

The invention relates to an interferometric distance-measuring method with delayed chirp signal and an interferometric distance-measuring apparatus.

BACKGROUND

In the area of electronic distance measurement, various principles and methods are known. One approach consists in emitting frequency-modulated electromagnetic radiation, such as, for example light, to the target to be surveyed and then receiving one or more echoes from back-scattering objects, ideally exclusively from the target to be surveyed, it being possible for the target to be surveyed to have both a reflective—for example retroreflectors—and a diffuse backscattering characteristic.

After reception, the optionally superposed echo signal is superposed with a mixed signal and the signal frequency to be analyzed is reduced thereby so that less outlay is required with respect to the apparatus. The mixing can be effected either as a homodyne method with the signal sent or as a heterodyne method with a periodic, in particular harmonic, signal of known period. Thus, the methods differ in that mixing is effected with the transmitted signal itself or with a harmonic signal having its own frequency. The mixing serves for transforming the received signal to lower frequencies and for amplifying said signal. Thereafter, the transit times and hence—in the case of a known propagation velocity of the radiation used—the distances to the targets to be surveyed are determined from the resulting signal. In a heterodyne interferometer arrangement, a tuneable laser light source is used for the absolute distance measurement. In the embodiment which is simplest in principle, the tuning of the optical frequency of the laser source is effected linearly. The received signal is superposed with a second signal which is derived from the emitted light signal. The resulting beat frequency of the heterodyne mixed product, the interferogram, is a measure of the distance to the target object. The apparatuses used for implementing these methods usually utilize a signal generator as a chirp generator, which impresses a signal on a modulatable radiation source. In the optical range, lasers which can be chirped by modulation of the external (for example Bragg grating) or internal cavity (for example Distributed Feedback (DFB) or Distributed Bragg Reflector (DBR)) are generally used as radiation sources. In the optical range, transmitting and receiving optical systems to which a detector or quadrature detector for heterodyne mixing, A/D convertor and digital signal processor are connected downcircuit are used for emission and for reception.

An example of an optical, coherent FMCW distance-measuring method is described in U.S. Pat. No. 4,830,486, this method having an accuracy in the region of phase-measuring methods in combination with a short measuring time. A chirp generator produces a linear frequency-modulated signal which is divided into a measuring signal and local oscillator signal, the two signals being superposed in a receiver.

SUMMARY

The change in the wavelength of the emitted light signal represents the scale of the measurement. This is generally not known and therefore has to be determined in an additional measurement. For this purpose, in the prior art, for example, a part of the emitted light is passed via a reference interferometer having a defined reference length. The change in the wavelength of the emitted light signal as a function of time can be inferred from the resulting beat product on the basis of the known reference length. If the reference length is not known or is unstable, for example owing to temperature influences, it can be determined via an additional calibration unit, for example a gas cell or a Fabry-Perot element.

EP 1 696 201 discloses such a distance-measuring method comprising emission of frequency-modulated electromagnetic radiation to at least one target to be surveyed and subsequent reception with heterodyne mixing of the radiation scattered back from the target, the radiation being passed in parallel over an interferometric reference length.

While a stationary target has a defined distance invariable as a function of time, moving or vibrating targets present some problems. A constant movement of the target leads, during tuning, to opposite Doppler shifts for the different directions of the frequency ramp. Thus, a movement leads, for example, to a positive Doppler shift on passing through an ascending frequency ramp, whereas a negative Doppler shift is produced in this case on passing through the descending ramp. By using successive ascending and descending ramps, this effect can be compensated.

However, the use of ramps following one another as a function of time, i.e. different or opposite chirps of the laser radiation, also reduces the useable measuring rate by a factor of two, for example from 1 kHz to 500 Hz, i.e. to half. Moreover, this approach is based on the fact that there is a constant target velocity during the time taken for passing through the two ramps. Accelerations of the target during the measuring process or vibrations cause errors in the measured distance.

In order to eliminate this problem, U.S. Pat. No. 7,139,446 proposes using two simultaneous and opposite frequency ramps, i.e. emitting radiation with two radiation components with opposite chirp, which also avoids the reduction of the measuring rate. In order to be able to separate these radiation components with respect to measurement, the emission thereof is effected with different polarization. By means of this approach, accelerations can be detected and vibrations eliminated. Opposite chirps are impressed on the two differently polarized radiation components, two separate laser sources being used for this purpose. Use of two sources, which in each case have to be modulated in an opposite manner or with a phase offset of 180°, requires an outlay in terms of apparatus, synchronization also being required in order to achieve isochronous behaviour.

It is therefore the object of the invention to provide an improved distance-measuring method with double chirp or such an apparatus.

A further object of the invention is to provide a corresponding distance-measuring apparatus having a simplified design, in particular without the use of a second laser source.

The solution according to the invention is based on an interferometric distance-measuring arrangement, such as, for example, the heterodyne interferometer arrangement disclosed in EP 1 696 201. According to the invention, the two radiation components with their opposite frequency curves are produced by a common laser source, for example a distributed feedback (DFB) laser diode. The separability of the radiation can be effected in principle by different polarization, but also in the signal processing by filtering in the frequency space or in another way. Here, the radiation generated has two radiation components which are chosen so that separation on the receiver side or separate evaluation is possible.

The phase shift of the two frequency curves is realized according to the invention by an optical delay path via which one of the two radiation components is passed. Synchronization of the two frequency curves is achieved thereby and an apparent second source is produced, the two signals showing identical frequency curves having a fixed phase relationship to one another on tuning. As a result, errors and nonlinearities affect the two signals to the same extent.

If separability of the two radiation components is effected by different polarizations, the splitting can be effected by a polarizing beam splitter arranged downstream of the laser diode, it being possible for the optical delay path to be formed by a polarization-preserving fibre.

Partly dispensing with polarization-preserving fibres and alternatively using single-mode fibres are possible if a polarization-adapting element is used which makes it possible to adjust or to adapt the polarization of the two radiation components. The use of polarization-preserving fibres can be limited to the delay path and the detector part in this approach, which makes it possible in particular to design the interferometer with standard single-mode fibres.

For characterizing the chirp signal, it is possible to record a reference interferogram, as also described in EP 1 696 201.

BRIEF DESCRIPTION OF THE DRAWINGS

The distance-measuring method according to the invention and the distance-measuring apparatus according to the invention are described or illustrated in more detail below, purely by way of example, with reference to working examples shown schematically in the drawing. Specifically.

DETAILED DESCRIPTION

Figure 1:
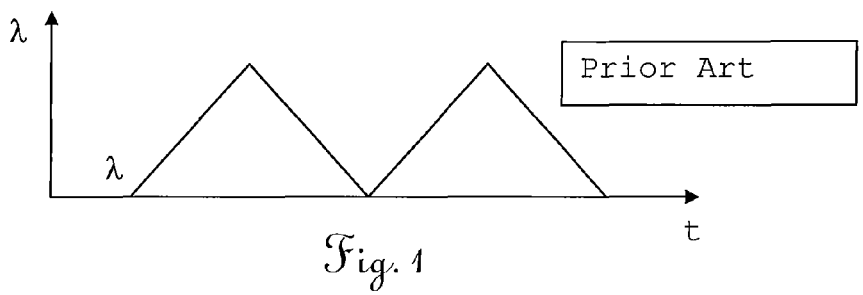
FIG. 1 shows the schematic diagram of the time dependency of the wavelength for interferometric distance-measuring methods.

FIG. 1 illustrates, in a schematic diagram, the time dependency of the wavelength for interferometric distance-measuring methods. The radiation emitted by the rangefinder is frequency-modulated by a signal generator so that ascending and descending ramps form as the wavelength λ varies as a function of time. However, this modulation or emission form of the prior art produces an ascending and descending ramp with a time separation, i.e. in sequence, so that the measuring rates are halved and changes within the timescale of a ramp or with corresponding periodicities may lead to errors.

Figure 2:
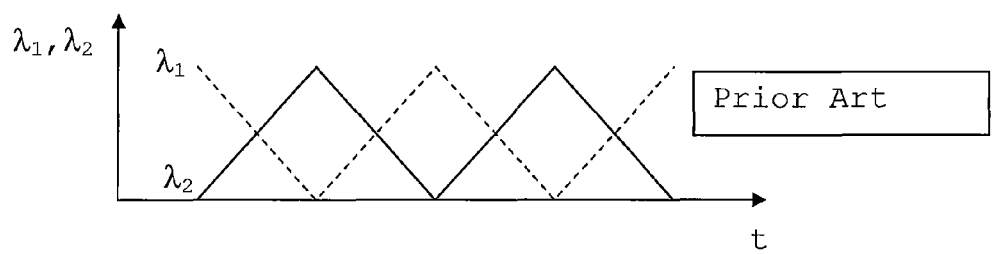
FIG. 2 shows the schematic diagram of the time dependency of the wavelength for interferometric distance-measuring methods with opposite chirp.

The time dependency of the wavelengths $\lambda_1$ or $\lambda_2$ of the modulated radiation components with opposite chirp shown schematically in FIG. 2 is therefore described in the prior art for interferometric distance-measuring methods. The radiation emitted to a target therefore has two radiation components with different variations of the wavelengths as a function of time, i.e. opposite frequency ramps. The radiation components can be emitted in particular with a phase offset of the opposite chirp of exactly 180°, i.e. strictly with opposite phases. This oppositeness is produced in the prior art by two differently modulated sources. According to the invention, a second, virtual source with phase-shifted frequency curve is generated by splitting the radiation of a common or single source and subsequently delaying one of the two radiation components. FIG. 2 shows the frequency curve of the radiation component which has not been delayed by means of a solid line with that of the delayed radiation component by means of a broken line.

If both radiation components are emitted via a common optical system to a common target or received by said optical system, separation must be permitted on reception for evaluating the two radiation components, which is solved in the prior art by different polarizations. In principle, however, other types of separabilities, for example spectrally or chromatically or algorithmically, can also be used in the method according to the invention or a corresponding apparatus.

Figure 3A:
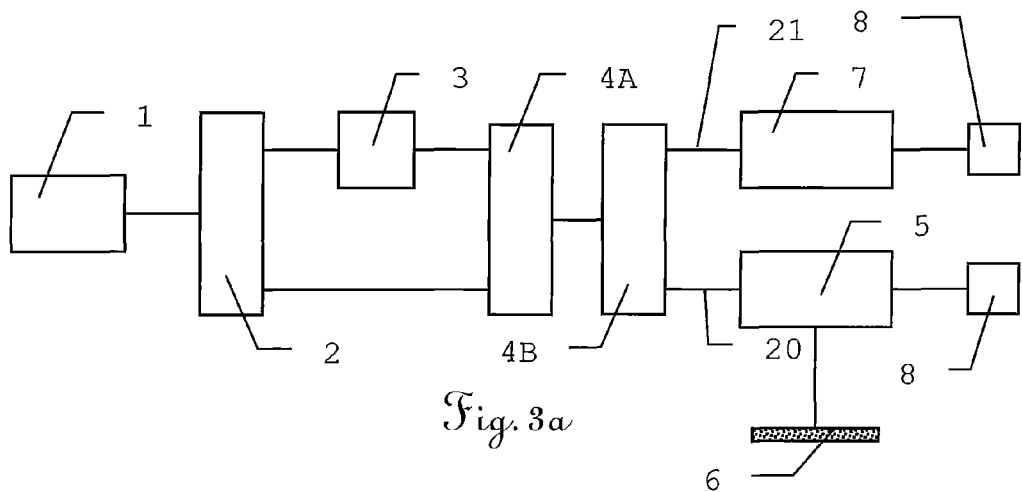
FIG. 3a-b show the schematic diagram of a first embodiment of the distance-measuring apparatus according to the invention.
Figure 3B:
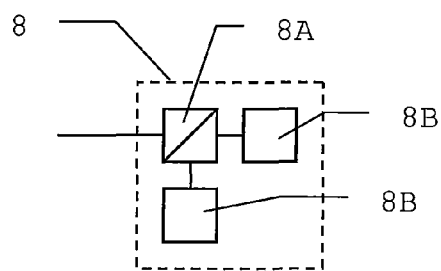

A first embodiment of the rangefinder according to the invention is shown schematically in FIG. 3a-b. The distance-measuring apparatus has a laser source comprising a DFB laser diode 1 for emission of chirped laser radiation to a target 6 to be surveyed, the laser radiation being frequency-modulated so that it has a chirp. The laser radiation produced by the laser diode is split by a polarizing beam splitter 2 into two π- and σ-polarized radiation components, one of the two radiation components being delayed relative to the other radiation component prior to emission, for example by passing it via the optical delay path 3 shown here. The length of the optical delay path is chosen so that an opposite frequency curve results at least for a time interval of each period. For maximizing the useful periods and for realizing the maximum measuring rate, the delay or the length of the delay path is chosen so that the radiation components can be emitted with a phase offset of the opposite chirp of 180°. For realization on the component side, for example, polarization-preserving fibres can be used for the delay path 3 and for guiding the radiation component which has not been delayed, the emission being effected in each case in the polarization axes of the fibres via polarization beam splitters. This separate coupling-in is maintained for the total setup so that practically two interferometers exist in parallel in this way.

In the case of spectral separability of the radiation components, two different sources with a single signal generator can be used for modulation, which always also necessitates the expense of two sources but permits a reduction of complexity and identity of the frequency curves through common modulation. The laser radiation to be emitted can, however, also be produced using a single source, for example if subsequent spectral separation or downstream production of the two radiation components, for example by an optically parametric oscillator, takes place or the source used for production produces two separable carrier wavelengths from the outset. Other possible laser sources are modulated electroabsorbtion lasers (EAL), as described, for example, in EP 1 906 137.

In the embodiments shown, however, the separability is permitted by different polarization of the two radiation components by way of example.

The two radiation components of the laser radiation are coupled in via two fibre couplers 4a and 4b or multiplexers, both in a measuring interferometer 5 with a measuring path 20, which comprises a beam guide via the target 6 to be surveyed, and in a reference interferometer 7 having a defined reference path 21, the two interferometers being shown here as functional units without further detail, purely schematically for reasons of illustration. A possible specific setup of the interferometers is given, for example, in the form of Mach-Zehnder interferometers. The interferometers each have a detector 8 for receiving the laser radiation scattered back from the target 6 or passed via the reference path 21.

According to the invention, a realization in which only one radiation component is passed into the reference interferometer is likewise possible, the phase information of the second radiation component, which is required for evaluating the measured interferograms, being obtained by a time delay in the processing unit—for example intermediate storage.

The reference interferometer in, for example, etalon or Mach-Zehnder configuration serves for taking into account or compensating nonlinearities in the tuning behaviour of the laser source. If the behaviour of the laser source is sufficiently linear or is known and stable, it is also possible in principle to dispense with the reference interferometer. As a rule, however, this is not the case. In addition to the reference interferometer, a calibration unit not shown here, in particular in the form of a gas cell or Fabry-Perot element, can also be integrated in order to determine the length of the reference interferometer. The use of such a calibration component is disclosed, for example, in EP 1 696 201.

Measuring and reference interferometers may also have a common path geometry, i.e. may have a partly common interferometer beam path for measuring arm and local oscillator arm. For the measuring interferometer, the local oscillator arm is defined here by a reflection at the optical exit surface, so that a constant, in particular known, distance is specified, further back-reflections being avoided. The measuring arm of the measuring interferometer is on the other hand defined by the reflection at the target 6 to be surveyed. The back-reflected light of measuring arm and local oscillator arm is finally passed to a common detector in this alternative.

The setup of an embodiment of the detector 8 is shown in more detail in FIG. 3b. The radiation scattered back by the target or the radiation passed in the local oscillator arm is passed through a polarization-dependent beam splitter 8A to the detector units 8B after separation of the radiation components. The signal evaluation can be carried out subsequently, for example by means of a heterodyne interferometric mixing method, a corresponding mixer being provided or the detector units 8B being formed as such mixers. The laser source and the choice for the polarization or carrier wavelengths are effected as a function of the separability and the components used on the detector side.

Figure 4:
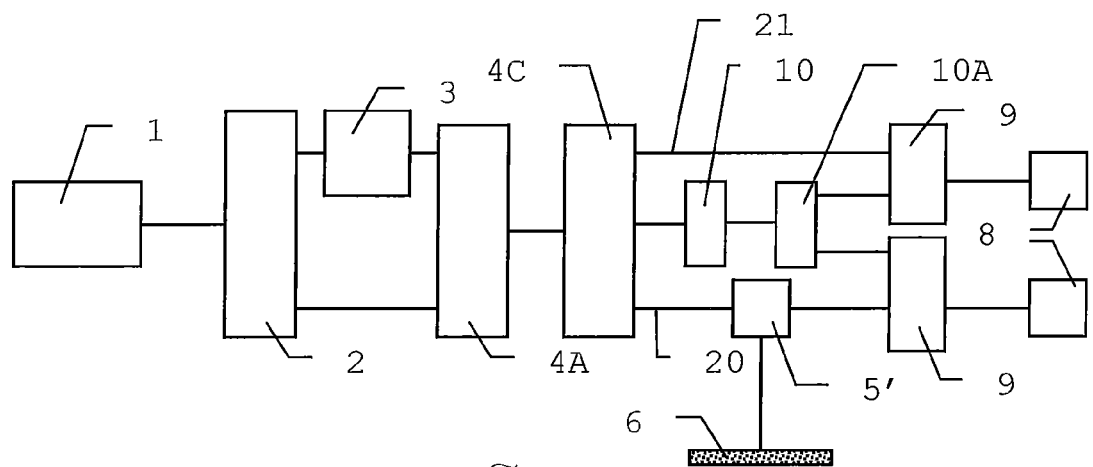
FIG. 4 shows the schematic diagram of a second embodiment of the distance-measuring apparatus according to the invention.

A second embodiment of the rangefinder according to the invention is shown in a schematic diagram in FIG. 4. This embodiment corresponds in basic concept to the first embodiment but has an acousto-optical modulator for raising the local oscillator of the two interferometers by the modulation frequency of the modulator 10 with subsequent beam splitter 10A, which facilitates the detectability. The splitting of the radiation is therefore effected via a fibre coupler 40 at a total of three exits for the two interferometers and the modulator 10. Combination is effected again by fibre couplers 9, the exit of which is connected in each case to the detector 8, at the exit of the interferometer before the detection.

For this second embodiment, the optical system 5' for emitting the laser radiation to a target 6 and receiving the laser radiation from said target is shown schematically in the measuring interferometer.

Figure 5:
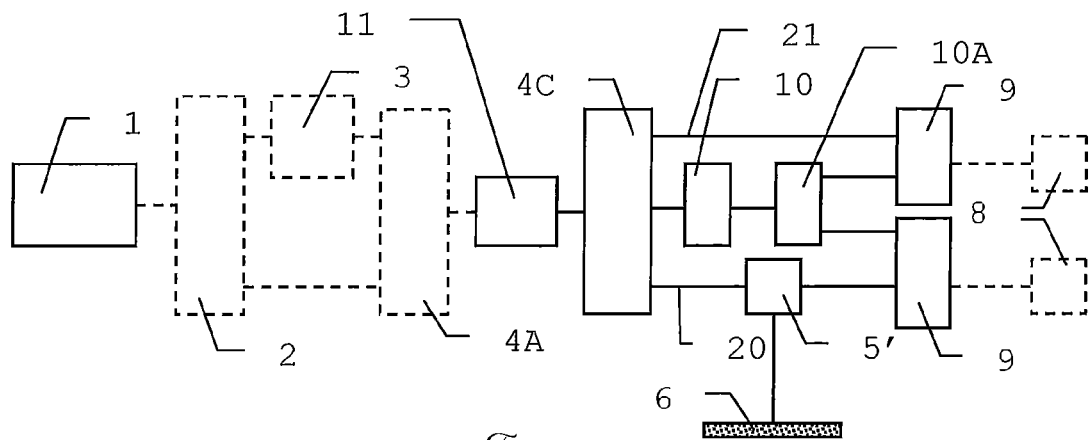
FIG. 5 shows the schematic diagram of a third embodiment of the distance-measuring apparatus according to the invention.

FIG. 5 shows a third embodiment of the distance-measuring apparatus according to the invention in a schematic diagram. A reduction of the share of polarization-preserving fibres can be achieved by using a polarization control element 11 downstream of the delay path 3 for adapting the polarizations of the two radiation components. Thus, a part of the optical connections between the components of the distance-measuring apparatus can be in the form of single-mode fibres. The polarization control element 11 compensates the influence of the single-mode fibres by changing the polarization until the reception of the two radiation components is optimal again on the detector side. By using the polarization control element 11, the use of polarization-preserving fibres can be limited to the region of the delay path 3 and the parallel undelayed beam guidance and the detectors 8, which is illustrated in this diagram by a broken line.

Figure 6:
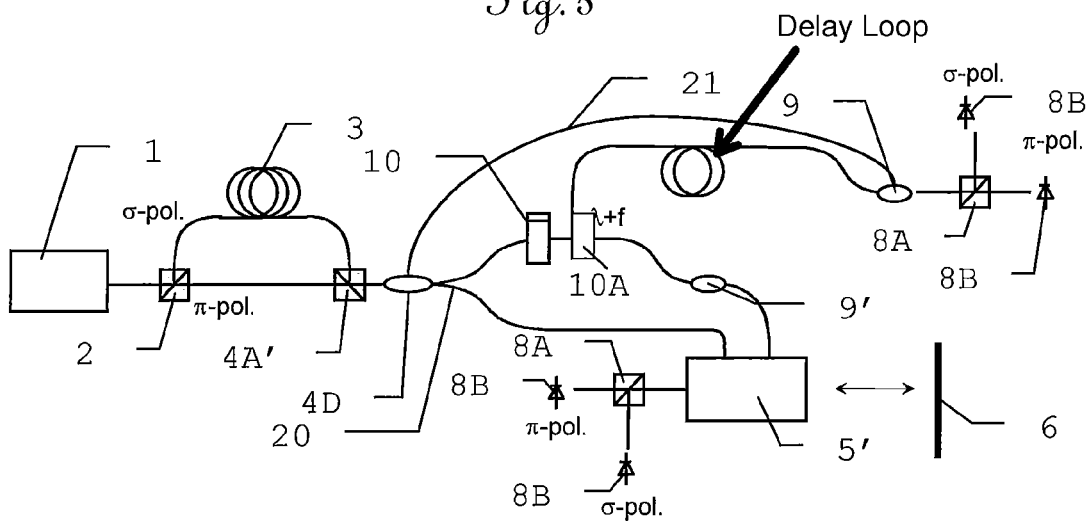
FIG. 6 shows the diagram of a possibility for realizing the second embodiment on the component side.

FIG. 6 shows an exemplary possible realization on the component side for the principle of operation of the second embodiment. The laser radiation is produced by a DFB laser diode 1, the connections between the optical components being in the form of polarization-preserving, monomodal fibres. The laser radiation is π- and σ-polarized by the polarizing beam splitter 2, in this embodiment the σ-polarized radiation component being passed via the delay path 3 which can be realized compactly in the form of fibre windings. At a repetition rate of the frequency curve of, for example, 10 kHz, the frequency ramps can be passed through isochronously and in opposite directions by such a delay path of 10 km, with the result that the 0.05 ms delay required for a phase shift of 180° is achieved. For example, the maximum loss is 0.2 dB/km (Corning SMF-28e) in the wavelength range 1.55 μm for a standard monomodal fibre, which means a loss of 2 dB for the transmission via the exemplary delay path.

The two radiation components are combined by an optical coupler 4A' and subsequently coupled again via a fibre coupler 4D into the measuring interferometer and the acousto-optical modulator 10 with downstream beam splitter 10A. The optical system 5' is in the form of a telescope having an at least partly common transmitting and receiving beam path, the target 6 to be surveyed being part of the measuring interferometer during the measurement. Via the optical paths and the fibre couplers 9, 9', the signals are transmitted to the detectors with polarization-dependent beam splitters 8A the detector units 8B for the two polarizations. The detector signals are then passed via electric cables to a signal processor. The signal processor performs the processing and evaluation of the signals and, optionally as a signal generator, controls the two beam sources via control cables.

Figure 7:
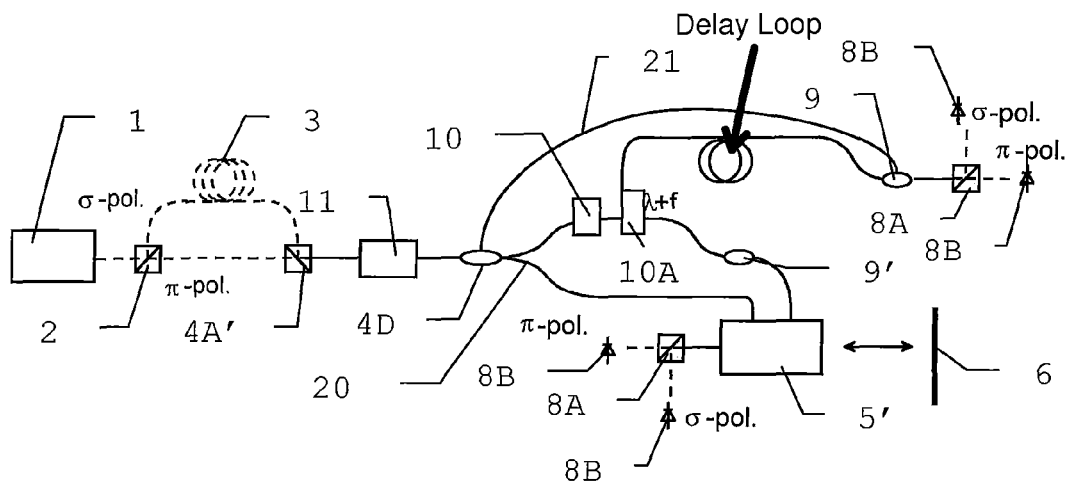
FIG. 7 shows the diagram of a possibility for realizing the third embodiment on the component side and FIG. 8 shows the diagram of a possibility for realizing a fourth embodiment on the component side.

A modification of the embodiment shown in FIG. 6 is shown in FIG. 7 as a possible realization on the component side for the third embodiment. The use of a polarization control element 11, with otherwise identical setup, makes it possible to dispense with polarization-preserving fibres in a large part of the distance-measuring apparatus. For this purpose, the polarization control element 11 is arranged behind the delay path 3. The polarization control element 11 matches the two polarizations so that the reception and the signals produced are optimized for the detector units 8B. As a result, influences due to the non-polarization-preserving components can be compensated. In this figure, the parts formed with polarization-preserving components are once again shown by means of broken lines.

Figure 8:
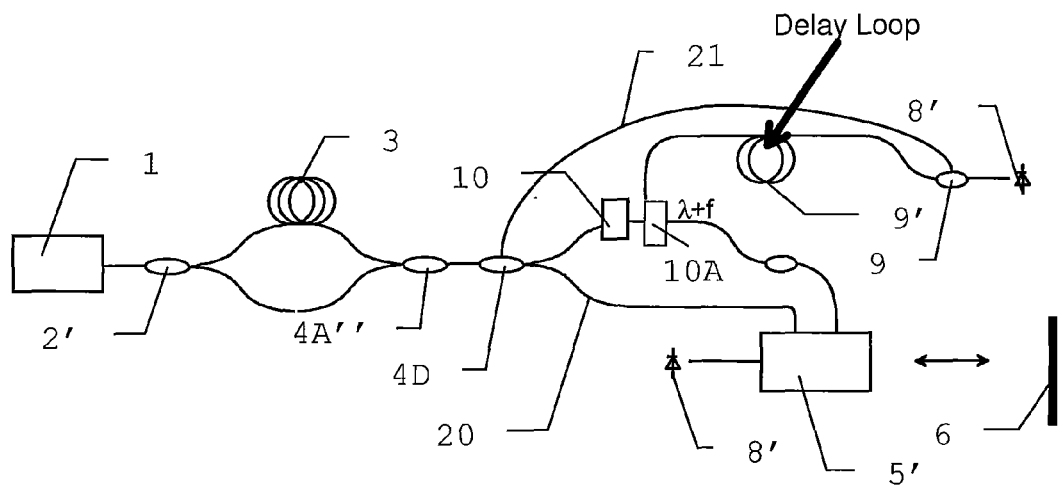

FIG. 8 shows a possible realization on the component side for a fourth embodiment of the distance-measuring apparatus according to the invention, the schematic diagram of which corresponds to FIG. 4. This embodiment therefore resembles in basic concept the second embodiment and the corresponding possible realization on the component side according to FIG. 6 but, owing to a corresponding signal processing, makes it possible completely to dispense with polarization-preserving fibres and polarization-separating detection, so that the detectors shown in FIG. 3b, with separate detector units with upstream polarization-dependent beam splitters, can be dispensed with. Thus, the detectors 8' each have only one detector unit. Here too, by the use of a delay path 3, it is possible in principle to dispense with a second DFB laser in which a virtual or apparent second source which emits in the same wavelength range is generated by the delay path 3 and a subsequent combination with the undelayed laser signal. By the use of the modulator 10 and the common detection of the two radiation components by the detectors 8', the carrier signals of the interferometers now appear at two different wavelengths off-set from one another by the frequency of the modulator 10, which permits analogue or subsequent software signal separation (filtering). On tuning of the frequency ramps in the range of several GHz, the signals of the radiation components will not markedly interfere as a rule owing to the limited bandwidth of the detectors 8'. Interference may occur only in the in the intersection region in the case of laser sources which have a coherence length in the range of the delay length, with the result that pairing is limited to half the tuning range. After the inversion point during tuning, radiation components or the delayed and the undelayed component change sides with respect to the modulator frequency.

As in this working example as a specific modification, it is also possible completely to dispense with polarization-preserving fibres and also to setup the delay path with customary fibre couplers 2' and 4A" in standard monomodal design. Suitable detectors 8' are standard pin diodes, and special signal separation with polarization beam splitters is not necessary.

What is claimed is:

1. A distance-measuring method comprising the steps emitting a chirped laser radiation having two separable radiation components from one laser light source to at least one target to be surveyed and via a local oscillator arm, the radiation components having an opposite chirp;
receiving the laser radiation scattered back from the target and the laser radiation passed via a reference path;
converting the laser radiation received into signals; and
determining at least one distance to the at least one target from the signals on the basis of interferometric mixing,
wherein, for generating the opposite chirp, one of the radiation components is delayed in time relative to the other radiation component prior to emission from the laser light source by means of an optical delay path, so that a virtual second laser source with time characteristic offset relative to the laser light source results.

2. A distance-measuring method according to claim 1, wherein one of the radiation components is delayed so that the radiation components are emitted with a phase offset of the opposite chirp of 180°.

3. A distance-measuring method according to claim 1, wherein the two radiation components have a different, orthogonal polarization.

4. A distance-measuring method according to claim 1, wherein the two radiation components have different carrier wavelengths.

5. A distance-measuring method according to claim, 4 wherein the two radiation components have different carrier wavelengths by opposite shifting of a common carrier wavelength by means of modulating the common carrier wavelength with an accousto-optical modulator.

6. A distance-measuring method according to claim 4, wherein analogue or software digital signal separation is carried out for the two radiation components.

7. A distance-measuring method according to claim 1, wherein referencing serves for taking into account or compensating nonlinearities in the production of the chirp during determination of the at least one distance.

8. A distance-measuring apparatus, comprising:
a frequency-modulatable laser light source for producing and for emitting chirped laser radiation to a target to be surveyed, the chirped laser radiation having two separable radiation components with opposite chirp;
a signal generator for modulating the laser light source;
a measuring interferometer having a detector for receiving the laser radiation scattered back from a target; and
a mixer for carrying out a heterodyne interferometric mixing method,
wherein, for generating the opposite chirp, the laser light source has an optical delay path for delaying one of the two radiation components before the emission from the laser light source, so that a virtual second laser light source with time characteristic offset relative to the laser source results.

9. A distance-measuring apparatus according to claim 8 wherein the length of the optical delay path is chosen so that the radiation components can be emitted with a phase offset of the opposite chirp of 180°.

10. A distance-measuring apparatus according to claim 8, wherein the laser source has a polarizing beam splitter for producing the separable radiation components.

11. A distance-measuring apparatus according to claim 10 further comprising a polarization control element arranged downstream of the delay path and intended for adapting the polarizations of the two radiation components.

12. A distance-measuring apparatus according to claim 11, wherein a part of the optical connections between components of the distance-measuring apparatus are in the form of single-mode fibres.

13. A distance-measuring apparatus according to claim 8, further comprising an acousto-optical modulator for raising arm oscillator of the measuring interferometer and a reference interferometer by a modulation frequency of the acousto-optical modulator.

14. A distance-measuring apparatus according to claim 13, wherein both radiation components are received by a common detector and analogue or software digital signal separation is subsequently effected for the two radiation components.

15. A distance-measuring apparatus according to claim 8, further comprising a reference interferometer for taking into account or compensating nonlinearities during the production of the chirp.

* * * * *

UNITED STATES PATENT AND TRADEMARK OFFICE
CERTIFICATE OF CORRECTION

PATENT NO. : 8,654,342 B2  Page 1 of 1
APPLICATION NO. : 12/937529
DATED : February 18, 2014
INVENTOR(S) : Jensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this

Twenty-ninth Day of September, 2015

Michelle K. Lee
*Director of the United States Patent and Trademark Office*